United States Patent [19]

Mitchell et al.

[11] 4,336,614

[45] Jun. 22, 1982

[54] TUBE-IN-SHELL HEAT EXCHANGERS

[75] Inventors: Colin H. Mitchell, Knutsford; Michael J. Young, Warrington, both of England

[73] Assignee: Nuclear Power Company Limited, London, England

[21] Appl. No.: 70,433

[22] Filed: Aug. 28, 1979

[30] Foreign Application Priority Data

Sep. 19, 1978 [GB] United Kingdom ............... 37299/78

[51] Int. Cl.³ ............................................. G21C 15/00
[52] U.S. Cl. ..................................... 376/405; 165/162; 376/442
[58] Field of Search .......................... 165/162, 172, 69; 176/18, 65, 78

[56] References Cited

U.S. PATENT DOCUMENTS

| 3,212,570 | 10/1965 | Holman | 165/162 |
| 3,626,481 | 12/1971 | Taylor et al. | 165/162 |
| 4,036,461 | 7/1977 | Soligno | 165/162 |
| 4,058,161 | 11/1977 | Trepaud | 165/162 |
| 4,078,967 | 3/1978 | Anthony | 176/78 |
| 4,098,329 | 7/1978 | Culver | 176/65 |
| 4,135,972 | 1/1979 | Anthony et al. | 176/78 |
| 4,154,295 | 5/1979 | Kissinger | 165/162 |
| 4,224,983 | 9/1980 | Thurston et al. | 165/162 |

FOREIGN PATENT DOCUMENTS

| 1138794 | 10/1962 | Fed. Rep. of Germany | 165/162 |
| 1249331 | 10/1971 | United Kingdom | 176/65 |

Primary Examiner—Harvey E. Behrend
Attorney, Agent, or Firm—Larson and Taylor

[57] ABSTRACT

A tube-in-shell heat exchanger wherein the tube bundle has a central spine which carries a series of bracing grids for the tubes. The grids are resiliently mounted on the spine so that differential thermal expansion of one group of tubes relative to other groups of tubes and structure can be accommodated without inducing severe thermal stress.

4 Claims, 8 Drawing Figures

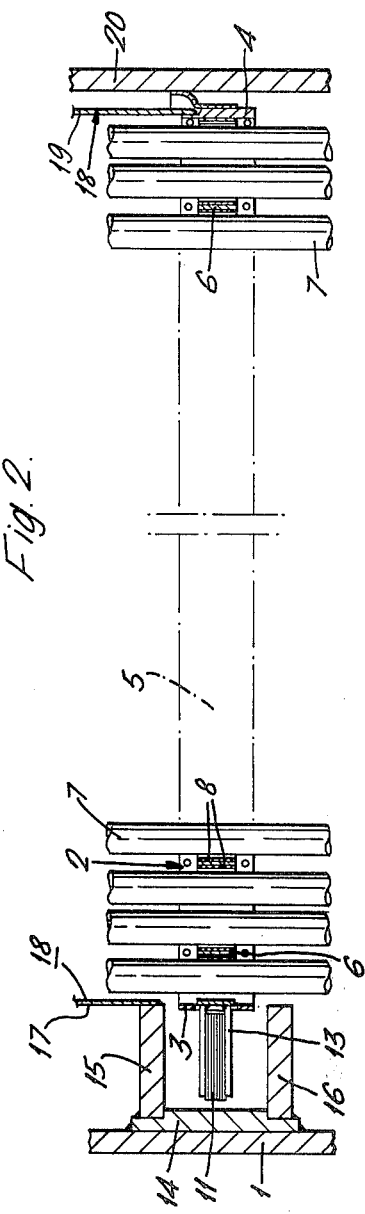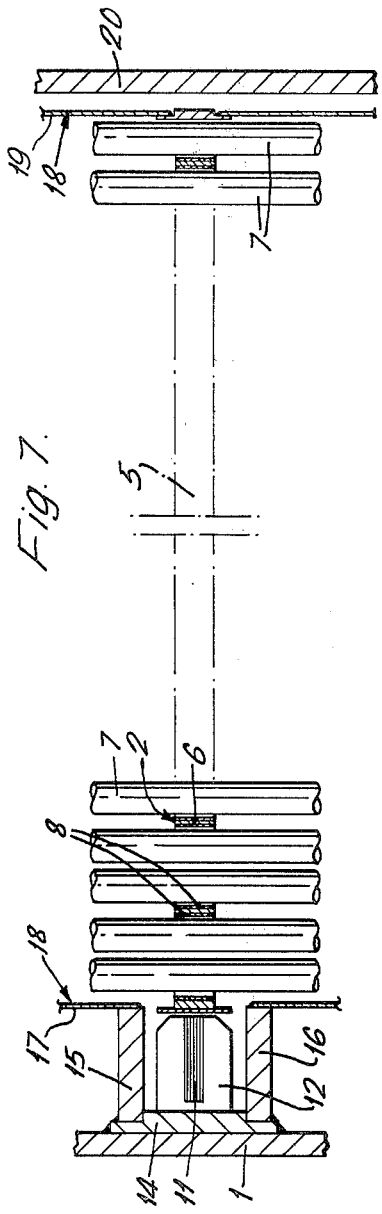

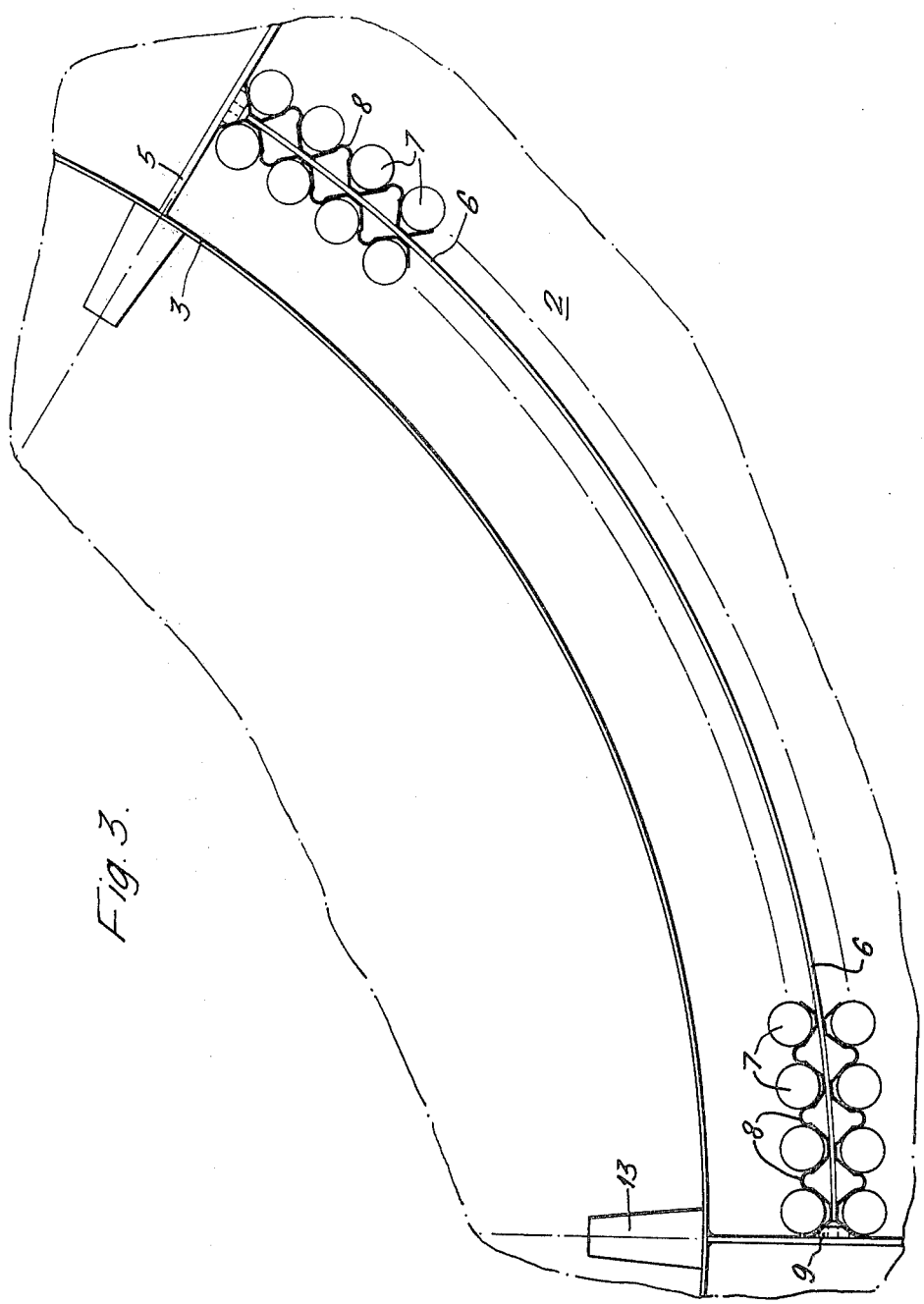

TUBE-IN-SHELL HEAT EXCHANGERS

BACKGROUND OF THE INVENTION

This invention relates to tube-in-shell heat exchangers and is directed towards intermediate heat exchangers for use in liquid metal cooled fast breeder nuclear reactor constructions.

A tube-in-shell heat exchanger comprises a closed shell housing a bundle of heat exchange tubes which pass through the shell by way of a transverse tube sheet or sheets. In use a first fluid flows through the shell in heat exchange with a second fluid flowing through the tubes. In one kind of tube-in-shell heat exchanger used as an intermediate heat exchanger in a liquid metal cooled fast breeder nuclear reactor constructions, the tubes being elongate and extending between opposed tubes sheets incorporate expansion bends and therefore are subject to severe vibration due to fluid flow through the shell. One expedient is to support the tubes transversely by a series of longitudinally spaced grids of which successive grids radially displace the tubes from their nominal in-line positions in opposed directions in order to strain the tubes. However, tube support provided by this expedient can be too rigid, and the differential movement of the tubes relative to the other parts of the structure thereby induces severe stress.

SUMMARY OF THE INVENTION

According to the invention in a tube-in-shell heat exchanger wherein the heat exchange tubes are arranged in a bundle and braced transversely by a longitudinal series of spaced grids, the grids are resiliently supported from a central spine of the tube bundle. The resilient supports provide flexibility in the mountings of the tube bundle on the central spine so that groups of heat exchange tubes can be longitudinally displaced relative to the spine and to adjoining groups of tubes to accommodate differential linear thermal expansion.

In a preferred construction of heat exchanger the spine has an annular series of radially outwardly extending forked brackets and each grid has an annular series of radially inwardly extending forked brackets, each bracket of one annular series being interposed between two neighbouring brackets of the other annular series, and there is a resilient annular member disposed to interengage each forked bracket.

In a liquid metal cooled fast breeder nuclear reactor construction of the kind comprising a nuclear fuel assembly submerged in a pool of coolant in a primary vessel, and a tube-in-shell intermediate heat exchanger according to the invention, the intermediate heat exchanger comprises a bundle of heat exchange tubes having a central spine extending longitudinally through the shell and a series of longitudinally spaced transverse grids resiliently mounted on the central spine within the shell and disposed to provide transverse support for bracing the tubes apart, successive grids displacing the tubes from their nominal in-line positions in opposed directions, resilient mountings for the grids on the central spine each comprising an annular series of brackets rigidly secured to the spine, the brackets each having a pair of radially outwardly extending forked arms, a complementary annular series of forked brackets having radially inwardly extending arms rigidly secured to a grid, each bracket of one series being interposed between two neighbouring brackets of the complementary series, and a resilient annular member disposed transversely to the spine in engagement with the forked arms of both complementary series of brackets.

DESCRIPTION OF THE DRAWINGS

A construction of tube-in-shell heat exchanger embodying the invention is described by way of example with reference to the accompanying drawings of which FIG. 2 is a fragmentary elevation in section on line II—II of FIG. 1, FIG. 3 is a fragmentary plan view of a tube bracing grid, FIG. 7 is a fragmentary elevation in section on line VII—VII of FIG. 1.

DESCRIPTION OF THE PREFERRED EMBODIMENT

Figure 1:
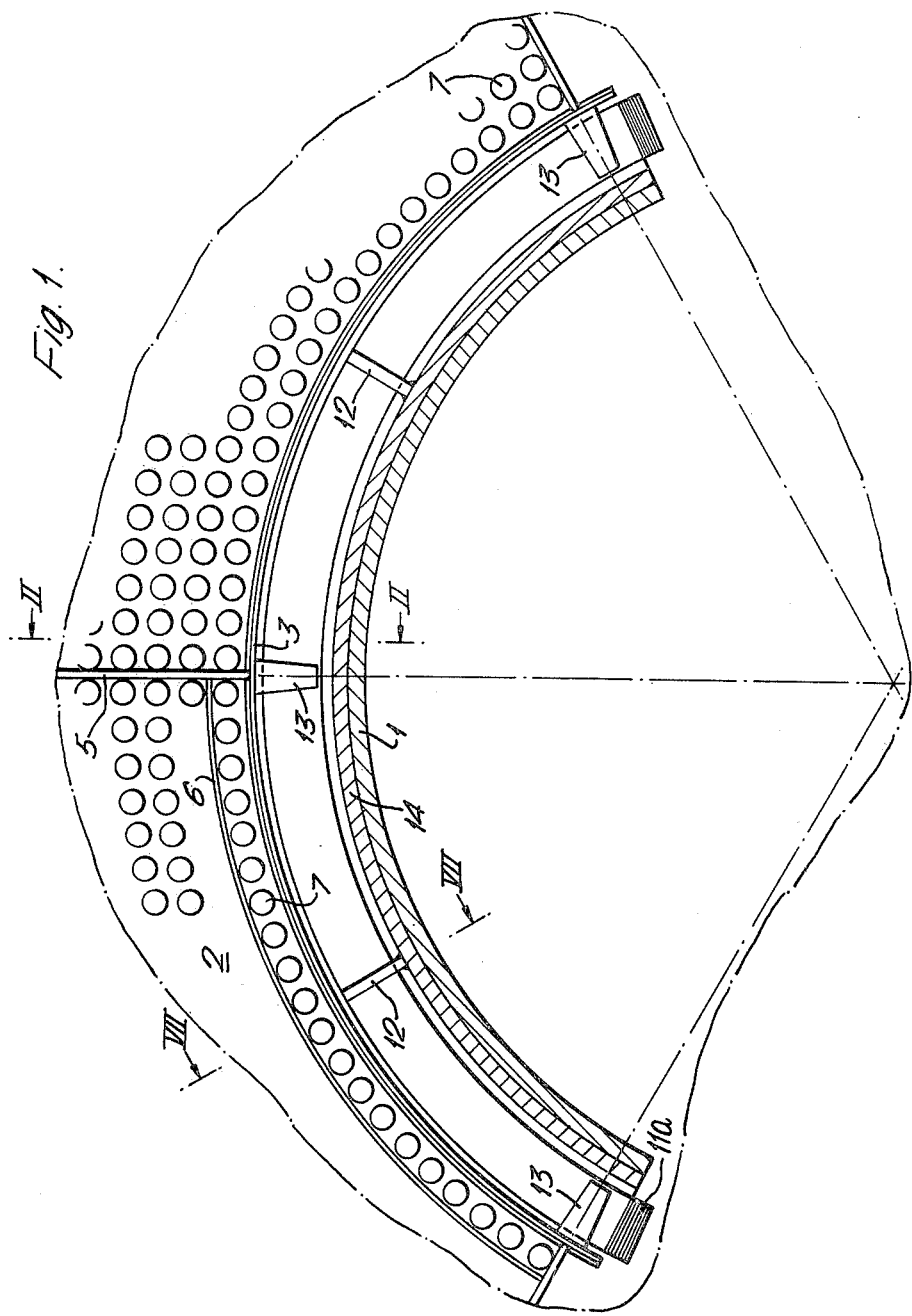
FIG. 1 is a fragmentary cross-section.
Figure 4:
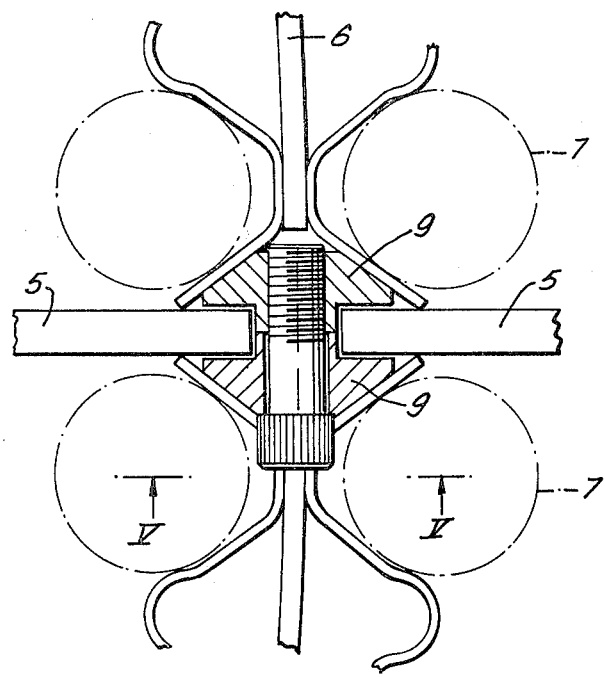
FIG. 4 is a fragmentary cross-sectional view of a detail of the grid shown in FIG. 3 and drawn to a larger scale.
Figure 5:
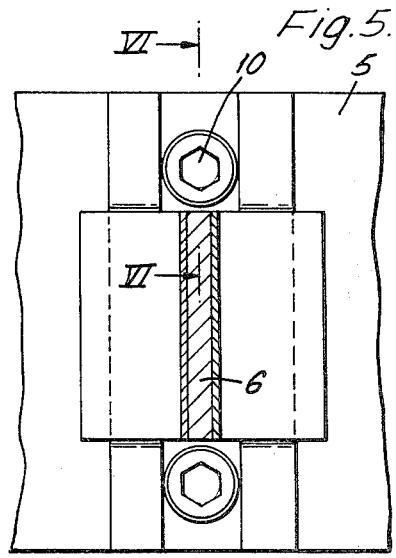
FIG. 5 is a fragmentary sectional view on line V—V of FIG. 4.
Figure 6:
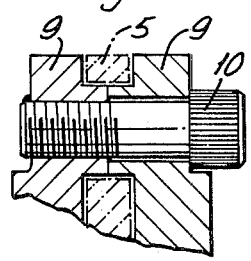
FIG. 6 is a fragmentary side view on line VI—VI of FIG. 5.

The tube-in-shell heat exchanger shown in the drawing is for use in a nuclear reactor construction to effect heat exchange between a primary liquid sodium coolant flowing through the tubes and a secondary liquid sodium coolant flowing through the shell. The shell is generally cylindrical and the tubes arranged in a bundle extend substantially parallel to the longitudinal axis of the shell and are secured at their ends to transverse tube sheets. The bundle of tubes has a central tubular spine and to provide transverse support for the heat exchange tubes there is a series of longitudinally spaced grids. Referring now to FIG. 1 there is shown a segment of the heat exchanger wherein is depicted the tubular spine designated 1 and a typical grid 2. With reference now to FIGS. 1 and 2 the grid comprises an inner strap 3 and a coaxial outer strap 4 co-joined by six equally angularly spaced radially extending spider arms or spokes 5. Extending between adjacent spider arms there are arcuate strap members 6 which are arranged to form spaced coaxial intermediate support straps for the heat exchange tubes 7 disposed in substantially coaxial banks. The arcuate strap members 6 carry corrugated strip 8 (as shown in FIG. 3) on each side, the corrugations each serving to cradle a tube 7 and the strips have end fittings for the arcuate strap members welded to them. The arcuate strap members 6 are attached to the spider arms by co-operating end fittings 9 which are fastened together with bolts 10 penetrating the spider arms as shown in FIGS. 4, 5 and 6. The inner and outer banks of tubes 7 are supported from the inner and outer straps 3 and 4 by corrugated strips 8 welded thereto. The corrugated strips are angularly displaced relative to each other, the displacement being in opposite directions for successive grids so as to brace the tubes at points along their lengths thereby to reduce the tendency to vibrate due to fluid flow through the shell. The grids are resiliently supported from the tubular spine 1 each by means of an annular spring 11 co-axially disposed with the spine and engaging with two circular series of six radially extending forked brackets 12, 13 associated with the spine 1 and grid 2 respectively. The spring 11 comprises a stack of relatively slidable annular laminations or leaves designated 11a in FIG. 1.

The six forked brackets 12 of a series each have a pair of radially outwardly extending arms and as shown in FIGS. 1 and 7 are welded to an annular stepped collar 14 which is itself welded to the tubular spine. Upper and lower flanges 15 and 16 carried by the collar 14 support sections of an inner wall 17 of an annular shroud 18 for the bundle of tubes. The six forked brackets 13 of a complementary series have radially inwardly extending forked arms which extend through slots in the inner strap 3 and as shown in FIGS. 1 and 2 are welded to recessed inner ends of the spider arms 5. Each forked bracket 13 is interposed between two neighbouring brackets 12. Each outer strip 4 is stepped to receive lower and upper ends of outer walls 19 of the tubular shroud 18 the lower end of each wall being welded to an outer strip 4 whilst the upper end for each wall is slidably fitted to an outer strap. The outer strap at the upper and lower grid plates of the series has an annular spring adapted to bear sealingly on the wall of the shell designated 20.

The described construction provides flexibility in the mountings of the tube bundle on the central spine so that groups of heat exchange tubes 7 can be longitudinally displaced relative to the spine and to adjoining groups of tubes to accommodate differential linear thermal expansion.

Figure 8:
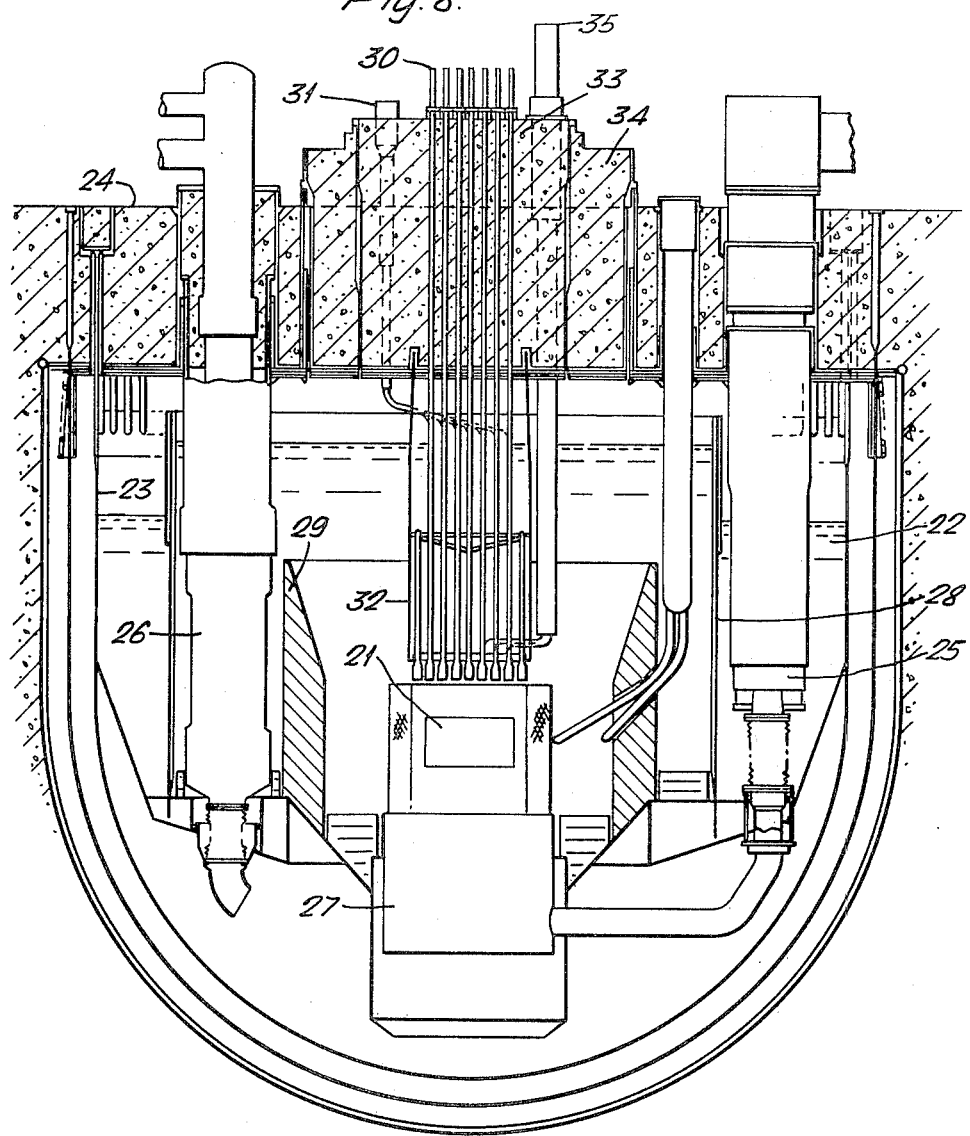
FIG. 8 is an elevation in section of a liquid metal cooled fast breeder nuclear reactor.

FIG. 8 illustrates a nuclear reactor of the liquid metal cooled fast breeder type having a fuel assembly 21 submerged in a pool 22 of liquid sodium coolant in a primary vessel 23. The primary vessel is suspended from the roof of a containment vault 24 and there is provided a plurality of coolant pumps 25 and heat exchangers 26 of the kind hereinbefore described, only one of each of the pumps and heat exchangers being shown. The fuel assembly 21 is mounted on a diagrid 27 and housed with the heat exchangers in a core tank 28 whilst the pumps, which deliver coolant to the diagrid, are disposed outside of the core tank. The core or fuel assembly 21 comprises a plurality of sub-assemblies which upstand from the diagrid in closely spaced side-by-side array and is surrounded by a neutron shield 29. Control rods 30 and instrumentation 31 are shown penetrating the roof of the vault and passing down towards the fuel assembly through a core cover plate structure 32. The core cover plate structure depends from a rotatable inner plug 33 which is mounted eccentrically in an outer plug 34 rotatable in an aperture in the roof of the vault. The plug 33 carries a fuelling machine 35 which, by rotation of the plugs 33, 34, can be arranged to command any fuelling position of the fuel assembly.

In operation of the nuclear reactor relatively cold coolant drawn from the region of the pool which is outside of the core tank 28 is flowed upwardly through the fuel assembly 21 by the pumps 25 by way of the diagrid 27. The coolant flow impinging on the core cover plate is deflected radially to flow into the intermediate heat exchangers 26 through which it passes in heat exchange with a secondary liquid metal coolant associated with steam generating plant disposed externally of the vault.

We claim:

1. A tube-in-shell heat exchanger comprising
a tubular shell having inlet ports for conducting a first heat exchange fluid through the shell,
a plurality of spaced heat exchange tubes extending longitudinally within the shell, the tubes penetrating at least one end closure of the shell for conducting a second heat exchange fluid,
a series of longitudinally spaced transverse grids for bracing the heat exchange tubes apart,
a spine disposed on the longitudinal axis of the shell for supporting said transverse grids, and
resiliently yieldable means for mounting said grids on the spine, each resiliently yieldable means comprising
an annular series of brackets rigidly secured to the spine, the brackets each having a pair of radially outwardly extending forked arms,
a complementary annular series of forked brackets having radially inwardly extending arms rigidly secured to a grid, each bracket of one series being interposed between two neighbouring brackets of the complementary series and
a resiliently flexible annular member disposed transversely to the spine in engagement with the forked arms of both complementary series of brackets.

2. A tube-in-shell heat exchanger according to claim 1 wherein the resilient annular member comprises a stack of relatively slidable annular laminations.

3. A tube-in-shell heat exchanger according to claim 2 wherein successive grids of the series brace the tubes from their nominal in-line positions in opposed directions.

4. In a liquid metal cooled fast breed nuclear reactor construction of the kind comprising a primary vessel, a pool of primary coolant contained in the primary vessel and a nuclear fuel assembly submerged in the pool of primary coolant,
a tube-in-shell intermediate heat exchanger immersed in the pool of primary coolant and comprising
a tubular shell having inlet and outlet ports for conducting primary coolant through the shell,
a plurality of spaced heat exchange tubes extending longitudinally within the shell, the tubes penetrating at least one end closure of the shell for conducting a secondary coolant,
a series of longitudinally spaced transverse grids for bracing the heat exchange tubes apart,
a spine disposed on the longitudinal axis of the shell for supporting said transverse grids and
resiliently yieldable means for mounting said grids on the spine, each resiliently yieldable means comprising
an annular series of brackets rigidly secured to the spine, the brackets each having a pair of radially outwardly extending forked arms,
a complementary annular series of forked brackets having radially inwardly extending arms rigidly secured to a grid, each bracket of one series being interposed between two neighbouring brackets of the complementary series, and
a resiliently flexible annular member disposed transversely to the spine in engagement with the forked arms of both complementary series of brackets.

* * * * *